United States Patent
Kim et al.

(10) Patent No.: US 9,399,292 B2
(45) Date of Patent: *Jul. 26, 2016

(54) SYSTEM, METHOD AND ROBOT TERMINAL APPARATUS FOR PROVIDING ROBOT INTERACTION SERVICE UTILIZING LOCATION INFORMATION OF MOBILE COMMUNICATION TERMINAL

(71) Applicant: KT Corporation, Seongnam (KR)

(72) Inventors: Hyun-ho Kim, Seoul (KR); Jong-Cheol Kim, Seoul (KR)

(73) Assignee: KT Corporation, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/588,586

(22) Filed: Jan. 2, 2015

(65) Prior Publication Data

US 2015/0120046 A1    Apr. 30, 2015

Related U.S. Application Data

(63) Continuation of application No. 13/882,450, filed as application No. PCT/KR2011/003707 on May 19, 2011, now Pat. No. 8,958,825.

(30) Foreign Application Priority Data

Oct. 27, 2010    (KR) .................. 10-2010-0105118

(51) Int. Cl.
*H04W 4/00* (2009.01)
*B25J 9/16* (2006.01)
*H04B 1/38* (2015.01)
(Continued)

(52) U.S. Cl.
CPC ............... *B25J 9/163* (2013.01); *B25J 9/1669* (2013.01); *H04B 1/38* (2013.01); *H04L 67/10* (2013.01); *H04W 4/02* (2013.01); *H04W 4/025* (2013.01); *H04W 4/043* (2013.01); *H04W 4/18* (2013.01); *H04W 84/005* (2013.01); *G05B 2219/39259* (2013.01); *G05B 2219/40202* (2013.01); *G05B 2219/40411* (2013.01);
(Continued)

(58) Field of Classification Search
None
See application file for complete search history.

(56) References Cited

U.S. PATENT DOCUMENTS

| 8,644,990 | B2 * | 2/2014 | Kim ...................... B25J 9/1656 318/568.12 |
| 2007/0021867 | A1 | 1/2007 | Woo |

(Continued)

FOREIGN PATENT DOCUMENTS

| KR | 10-2006-0092694 A | 8/2006 |
| KR | 10-2006-0126190 A | 12/2006 |

(Continued)

*Primary Examiner* — Diane Mizrahi
(74) *Attorney, Agent, or Firm* — Sughrue Mion, PLLC (57) ABSTRACT

A system and a method for providing a robot interaction service utilizing a location-based service of a mobile communication terminal. The system for providing a robot interaction service utilizing location information of a mobile communication terminal, includes: a mobile communication terminal for performing a mobile communication service through a wireless communication network, measuring a current location thereof and transmitting the measured location information to a predetermined robot terminal through a communication network; and a robot terminal for receiving the location information from the mobile communication terminal, determining a robot behavior based on the received location information, and controlling the operation thereof according to the determination result.

18 Claims, 4 Drawing Sheets

(51) Int. Cl.
  *H04W 4/02*    (2009.01)
  *H04W 4/04*    (2009.01)
  *H04W 4/18*    (2009.01)
  *H04L 29/08*   (2006.01)
  *H04W 84/00*   (2009.01)

(52) U.S. Cl.
  CPC ..... *G05B 2219/40543* (2013.01); *Y10S 901/46* (2013.01); *Y10S 901/50* (2013.01)

(56) References Cited

U.S. PATENT DOCUMENTS

2010/0010669 A1    1/2010    Lee et al.

2010/0298976 A1*   11/2010   Sugihara ................ A63H 11/20
                                                                700/248
2011/0118870 A1*   5/2011    Sugihara ................ A63H 11/20
                                                                700/245

FOREIGN PATENT DOCUMENTS

| KR | 10-2007-0012122 A | 1/2007 |
| KR | 10-0684195 B1 | 2/2007 |
| KR | 10-2007-0099831 A | 10/2007 |
| KR | 10-2009-0012542 A | 2/2009 |
| KR | 10-2010-0007386 A | 1/2010 |
| KR | 10-2010-0033675 A | 3/2010 |

* cited by examiner

SYSTEM, METHOD AND ROBOT TERMINAL APPARATUS FOR PROVIDING ROBOT INTERACTION SERVICE UTILIZING LOCATION INFORMATION OF MOBILE COMMUNICATION TERMINAL

CROSS-REFERENCE TO RELATED APPLICATION

This is a continuation of U.S. patent application Ser. No. 13/882,450, filed Mar. 29, 2014, now allowed, which is was an application is a national phase entry under 35 U.S.C. §371 of International Application No. PCT/KR2011/003707 filed May 19, 2011, which claims priority to Korean Patent Application No. 10-2010-0105118 filed in the Republic of Korea on Oct. 27, 2010, the disclosures of which are incorporated herein by reference in their entirety.

BACKGROUND

1. Field

Exemplary embodiments broadly relate to providing an interaction service utilizing a robot, and more particularly, to a system, an apparatus, and a method for providing a robot interaction service utilizing a location-based service of a mobile communication terminal.

2. Description of the Related Art

Recently, with the rapid development in the computer, electronics and communication technology, various wireless communication services are provided based on a wireless communication network. The most basic wireless communication service is to provide a wireless voice communication service between users of mobile communication terminals, which is free from time and location, and also supplemented by a text messaging service.

In addition, as internet based on transmission control protocol/internet protocol (TCP/IP) is becoming more established, systems capable of searching various kinds of information via the internet or transmitting various kinds of data, such as texts, voices, images, movies, or the like, in real time are rapidly developing, and in order to use various internet-based communication services in a better environment, the use of a high-speed communication network is dramatically increasing.

Moreover, in order to provide a space-transcended communication service, a wireless internet service, which provides internet communication services to the subscribers of a mobile communication service based on a wireless communication network have been introduced. Accordingly, many companies are putting their efforts toward the development of wireless internet techniques. The wireless internet service is a great step forward to individual services provided with the use of personal terminals. One of the characteristics of the wireless internet service is that it can provide inherent information based on the user's mobility.

To keep up with these trends, smart phones, which are open type cellular phones, such as an iphone, an android phone, or the like, have spread rapidly. Most of these smart phones have a global positioning system (GPS), a mobile communication network, a wireless local area network (LAN), or the like, which can track location of the device as needed e.g., continuously, periodically, or on request. Recently, various smart phone applications using these location based services have gained popularity and are attracting much attention from the smart phone users.

Meanwhile, in a related art robot system, a robot is disconnected from a network, and even if a robot is connected to a network, the robot simply displays information of a server or sends and receives a simple message in the network. Although some of the related art robots may send or receive movies with a remote-control function by linking with cellular phones, various services capable of interacting with an individual user by linking a privately-owned cellular phone with a robot in a network are still needed.

That is, services using a related art robot have problems in that a user cannot share his/her emotions nor interact with the robot. Therefore, research and development into improving these drawbacks are needed.

SUMMARY

Exemplary embodiments are designed to solve the problems described above, and therefore it is an aspect of exemplary embodiments to provide a robot system which may interact with a user based on location information of a mobile communication terminal capable of measuring a location, by linking a personal mobile communication terminal with a robot.

Another aspect of exemplary embodiments is to provide a robot interaction service which may provide various services to better convenience a user in real life, by figuring out the user's location information together with the surrounding condition information of a robot.

Illustrative, non-limiting embodiments may overcome the above disadvantages and other disadvantages not described above. The present invention is not necessarily required to overcome any of the disadvantages described above, and the illustrative, non-limiting embodiments may not overcome any of the problems described above. The appended claims should be consulted to ascertain the true scope of the invention According to an aspect of an exemplary embodiment, a system for providing a robot interaction service utilizing location information of a mobile communication terminal is provided. The system includes: a mobile communication terminal which performs a mobile communication service using a wireless communication network, which determines a current location thereof and transmits the determined location information to a robot terminal using the communication network; and the robot terminal which receives the location information from the mobile communication terminal, which determines a robot behavior based on the received location information, and which controls the operation thereof according to the determined robot behavior.

According to another aspect of an exemplary embodiment, a method for providing a robot interaction service utilizing location information of a mobile communication terminal is provided. The method includes by a mobile communication terminal measuring the current location and transmitting the location information to a robot terminal in a house using a communication network; by the robot terminal, receiving the location information of the mobile communication terminal through the communication network, and obtaining surrounding condition information by detecting a surrounding condition with a sensor; determining by the robot terminal, a robot behavior based on the combined information of the received location information and the obtained surrounding condition information; and by the robot terminal, controlling the operation thereof according to the result of the robot behavior determination.

According to still another aspect, a robot terminal apparatus for providing a robot interaction service utilizing location information of a mobile communication terminal. The robot terminal includes: a communication interface configured to communicate with a mobile communication terminal using a communication network, configured to request location information of the mobile communication terminal from the mobile communication terminal and configured to receive the location information measured by the mobile communication terminal; a sensor configured to detect a surrounding condition and configured to obtain surrounding condition information; a behavior determinator configured to determine a robot behavior by combining the location information received from the communication interface and the surrounding condition information obtained from the sensor; and an operation controller configured to control the operation of a robot terminal according to the determination result of the behavior determinator.

According to exemplary embodiments, since current location information, figured out by a user's mobile communication terminal, is used to determine interaction behaviors of a robot, a robot provides various interaction behaviors to a user based on the user's movement and location. Therefore, emotional interaction may be achieved between a user and a robot, and the user's interest may increase.

In addition, since a robot determines its behavior in consideration of a user's location together with a surrounding condition of a robot, the robot may express various emotional behaviors, and improve convenience to a user in real life.

BRIEF DESCRIPTION OF THE DRAWINGS

Non-limiting and non-exhaustive exemplary embodiments will be described in conjunction with the accompanying drawings. Understanding that these drawings depict only exemplary embodiments and are, therefore, not to be intended to limit its scope, the exemplary embodiments will be described with specificity and detail taken in conjunction with the accompanying drawings, in which.

DETAILED DESCRIPTION OF EXEMPLARY EMBODIMENTS

Further purpose and advantages of the present disclosure will become more apparent from the following description and the accompanying exemplary embodiments. Also, the purpose and advantages of the present disclosure may be achieved in accordance with particular means illustrated in the scope of the present disclosure and the combination thereof.

Hereinafter, exemplary embodiments will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just examples for the purpose of illustrations only, not intended to limit the scope of the disclosure, so it should be understood that other equivalents and modifications could be made thereto without departing from the spirit and scope of the disclosure.

Figure 1:
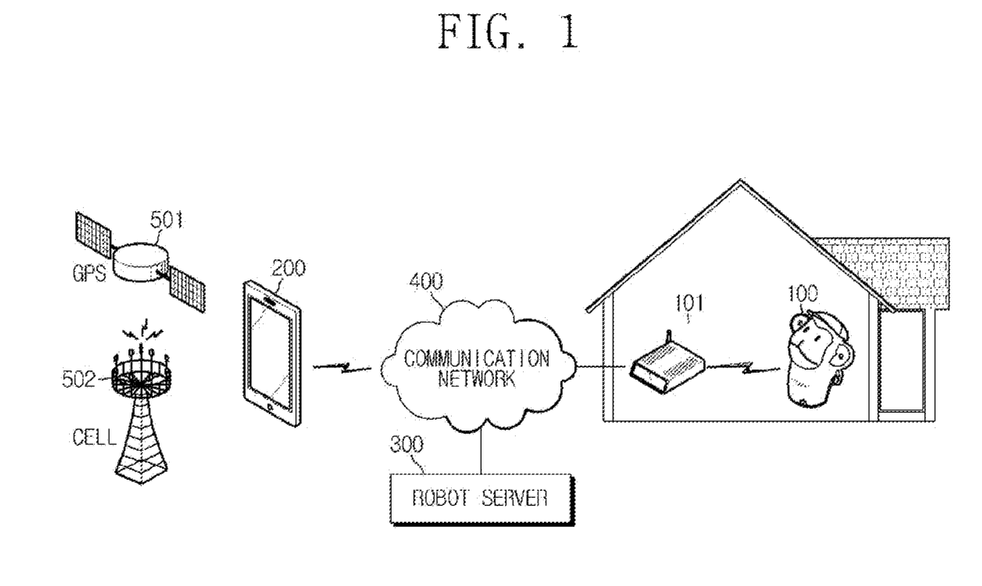
FIG. 1 is a view showing a system for providing a robot interaction service utilizing location information of a mobile communication terminal according to an exemplary embodiment.

FIG. 1 is a view showing a system for providing a robot interaction service utilizing location information of a mobile communication terminal according to an exemplary embodiment.

By linking a user's mobile communication terminal with a robot terminal under a wire and wireless network communication environment, a system for providing a robot interaction service according to exemplary embodiments provides a service which may perform various interaction behaviors of a robot terminal according to user's location information.

Referring to FIG. 1, the system for providing a robot interaction service according to an exemplary embodiment includes a robot terminal 100 (i.e., a robot) placed in a user's house or a specific place and connected to a network 400 to interact with a user, a mobile communication terminal 200 carried by a user and performing a communication service, a robot server 300 for relaying information of the robot terminal 100 and the mobile communication terminal 200, a wire and wireless communication network 400 accessed by the terminals and the server, respectively connected to each other, and location measuring devices 501, 502 for measuring location information at the mobile communication terminal 200.

The robot terminal 100 is a personal robot device terminal which is connected to the mobile communication terminal 200 via the communication network 400 to communicate location information and data thereto and which determines a robot behavior according to location information of the mobile communication terminal 200 to execute various functions of a robot and perform various robot behaviors. The robot terminal 100 is located in a user's house or a user's preferred place and is connected to the communication network 400. In general, the robot terminal 100 wirelessly accesses the communication network 400 through an in-house wireless access point 101 or an in-house router which is connected to the communication network 400 as shown in FIG. 1.

In addition, the robot terminal 100 may determine a robot behavior not only based on user's location information obtained from the mobile communication terminal 200, but also by combining the user's location information with surrounding condition information after detecting the surrounding condition information with a sensor, or the like. Therefore, subtle interaction behaviors may be performed, and home network devices may be controlled according to surrounding conditions (e.g. turning on a light in a room, turning on a TV, etc.) in linkage with an in-house home network. The robot terminal 100 will be described in further detail later with reference to the accompanying drawings. In an exemplary embodiment, the robot terminal includes at least a memory, a processor, and a display. In yet another exemplary embodiment, the robot terminal 100 may be a tangible robot having at least one of a head with a display and hands.

The mobile communication terminal 200 is a wireless communication terminal device having a communication function to allow a voice communication service or a short message service to be available between users who are using different mobile communication terminals in the communication network 400. Besides the performance of a wireless communication service, the mobile communication terminal 200 measures the current location of the mobile communication terminal and transmits the measured location information to another terminal or node. For this, the mobile communication terminal 200 is provided with a GPS receiver or a cell/station/wireless LAN-based location measuring module for measuring location information. The mobile communication terminal 200 may include a cellular phone, a PCS phone, a CDMA phone, a WCDMA phone, a GSM phone, a PDA phone, a smart phone, or the like, and a smart phone in which applications are installed to perform various services, is preferred.

The mobile communication terminal 200 may communicate with the robot terminal 100 to transmit the measured location information and may include a robot interaction application for displaying information data received from the robot terminal 100. Since the robot interaction application is executed at the mobile communication terminal 200 (or is automatically executed when the mobile communication terminal accesses the internet), the mobile communication terminal 200 transmits the current IP address to the robot server 300, and the server may relay data to the robot terminal 100. Moreover, after a communication is made between the mobile communication terminal 200 and the robot terminal 100, when the robot terminal 100 requests location information, the mobile communication terminal 200 measures and provides the location information to the robot terminal 100. Also, when information data are transmitted from the robot terminal 100, the mobile communication terminal 200 outputs the transmitted information data on a display of the mobile communication terminal, for example. The information data may include data, data such as emotional message data transmitted from the robot terminal 100 as being an interaction behavior according to a user's location.

The robot server 300 is provided at a predetermined node of the communication network 400 and relays information between the mobile communication terminal 200 and the robot terminal 100. The robot server 300 stores identifiers and IP addresses of a plurality of the mobile communication terminals, and stores and manages identifiers and IP addresses of robot terminals corresponding to those of the mobile communication terminals. Thus, when the mobile communication terminal or the robot terminal requests an IP address of the corresponding terminal, the robot server 300 extracts and provides the IP address registered and stored in the corresponding terminal.

In an exemplary embodiment, the robot server 300 receives an IP address from the mobile communication terminal and stores the IP address together with an identifier of the mobile communication terminal. Then, when the robot terminal requests IP address information of the mobile communication terminal, the robot server extracts the stored IP address based on the identifier of the mobile communication terminal and transmits the extracted IP address to the robot terminal. As a result of the exemplary procedures described above, although an IP address of the mobile communication terminal frequently changes, as long as the changed IP address is transmitted to the robot server 300 and stored therein with registration, the robot terminal may communicate with the mobile communication terminal by searching for the changed IP address information in the robot server, and thus, the communication between the two may continue. Of course, it is also possible that an IP address of the robot terminal is stored in the robot server with registration and the mobile communication terminal requests and receives the IP address of the robot terminal.

The communication network 400 is a network in which the robot terminal 100, the mobile communication terminal 200, the robot server 300, or the like are connected to each other, and the internet may be included therein.

The location measuring devices 501, 502 in a wire and wireless mobile communication network environment are equipment capable of measuring current location information of the mobile communication terminal 200 in a network environment. The location measuring devices 501, 502 may include a GPS satellite 501, a station cell, a wireless LAN cell 502, or the like. The GPS satellite 501 is equipment for measuring a location coordinate with a GPS receiver included in the mobile communication terminal and providing the measured location coordinate. The station cell or wireless LAN cell 502 is equipment accessed by the mobile communication terminal for wireless communications and allows the mobile communication terminal to measure current location information by using the cell information of a station or wireless LAN currently accessed by the mobile communication terminal for wireless communications.

Hereinafter, a robot terminal apparatus in the system for providing a robot interaction service utilizing location information of a mobile communication terminal according to an exemplary embodiment will be described in further detail with reference to FIG. 2.

Figure 2:
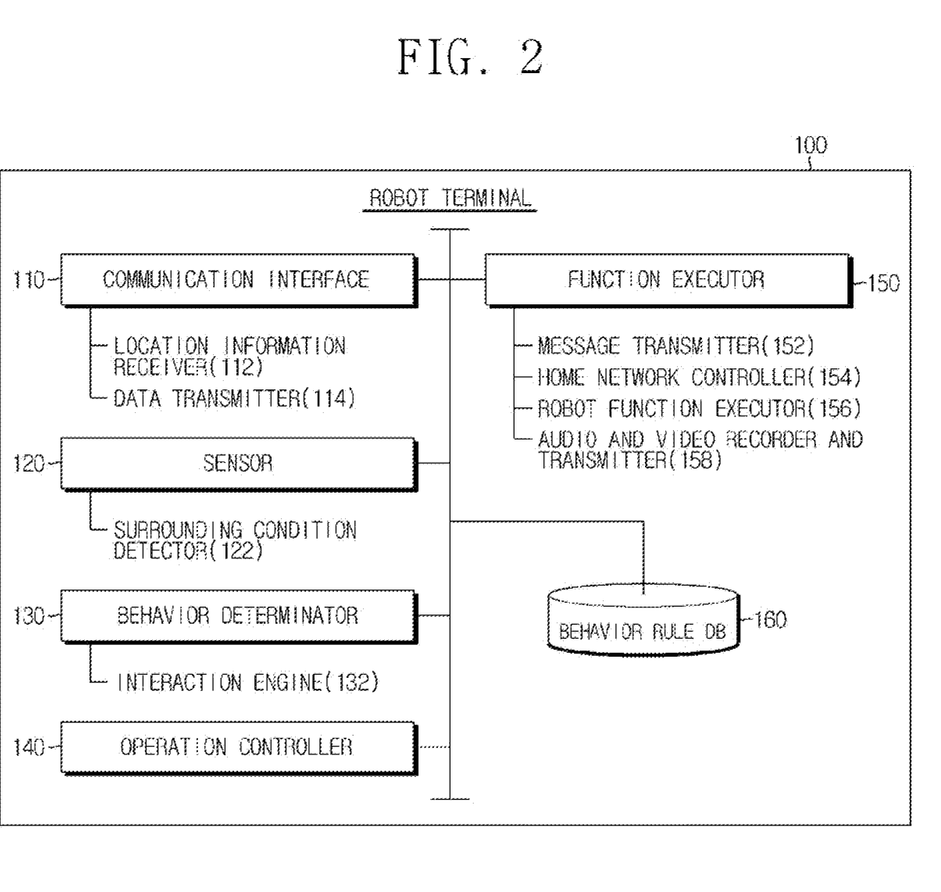
FIG. 2 is a view showing a robot terminal apparatus for providing a robot interaction service utilizing location information of a mobile communication terminal according to an exemplary embodiment.

FIG. 2 is a view showing a robot terminal apparatus for providing a robot interaction service utilizing location information of a mobile communication terminal according to an exemplary embodiment.

Referring to FIG. 2, the robot terminal apparatus 100 according to an exemplary embodiment includes a communication interface 110, a sensor 120, a behavior determinator 130, an operation controller 140, a function executor 150, a behavior rule DB 160, or the like.

The communication interface 110 communicates with the mobile communication terminal 200 in the communication network 400 to send or receive information and data. The communication interface 110 includes a location information receiver 112, a data transmitter 114, or the like. The location information receiver 112 is connected to the mobile communication terminal 200 to request current location information and receive the measured location information from the mobile communication terminal in response to the request. The location information receiver 112 may periodically request and receive the location information of the mobile communication terminal 200 at predetermined time intervals by using various settings.

The data transmitter 114 transmits information data to the mobile communication terminal 200. The data transmitter 114 transmits messages and audio or video recording data, generated by the operation of the function executor 150, described later, to the mobile communication terminal 200. The transmitted messages or data may include emotional messages interactively generated according to the user's location information and surrounding condition information of the robot terminal.

The sensor 120 detects surrounding conditions of the robot terminal 100 to obtain surrounding condition information. The sensor 120 includes a surrounding condition detector 122, or the like. The surrounding condition detector 122 includes sensors which detect surrounding conditions of the robot terminal 100, current condition thereof, etc. The sensors of the surrounding condition detector 122 may include a motion detection sensor, a temperature and humidity detection sensor, a light detection sensor, a fire detection sensor, time, date and weather sensors for detecting a current condition, a home network sensor for detecting operations and conditions of devices connected to a home network, or the like. Besides the above mentioned sensors, exemplary embodiments may further include various kinds of sensors capable of detecting the surrounding conditions of the robot terminal 100.

The behavior determinator 130 determines a robot behavior based on the location information of the mobile communication terminal 200 and the surrounding condition information of the robot terminal 100 respectively obtained by using the communication interface 110 and the sensor 120. The behavior determinator 130 includes an interaction engine 132, or the like. When the obtained location information and the surrounding condition information are input, the interaction engine 132 determines a behavior, which will interact with a user according to the combination of the inputted information, with reference to the behavior rule DB 160, described later, and outputs behavior information of the robot terminal. The interaction engine 132 determines behavior information of the robot terminal according to the information and rules stored in the behavior rule DB 160, described later. Here, the information and the rules of the behavior rule DB may change according to the operation of a user and a service operator.

After the behavior determinator 130 determines a robot behavior, the operation controller 140 controls the operation of the robot terminal according to the determined behavior information. That is, the operation controller 140 generates a signal, which controls the operation of a robot according to the determined robot behavior information, and transmits the signal to the function executor 150, described later, to control the execution of each function of the robot terminal.

The function executor 150 executes all kinds of functions of a robot according to the operation control signal of the operation controller 140. The function executor 150 includes a message transmitter 152, a home network controller 154, a robot function executor 156, an audio and video recorder and transmitter 158, or the like.

The message transmitter 152 generates a message according to the operation control signal and transmits the message to the mobile communication terminal 200 using the communication interface 110. Thus, an emotional message may be generated and transmitted to the mobile communication terminal 200, and a user may check the message using the mobile communication terminal 200.

The home network controller 154 is connected to a home network and controls operations of devices of the home network according to the operation control signal generated by the operation controller 140. Therefore, various operations, such as turning on or off a light in a room, turning on or off a TV, controlling the temperature of an indoor heater, etc., may be performed.

The robot function executor 156 executes functions of a robot according to the operation control signal. That is, the robot function executor 156 executes all kinds of functions included in the robot terminal 100, such as turning on or off a lamp, outputting an image on a display window, moving a robot, outputting voice and melody to a speaker, moving a robot arm, etc. Therefore, when a user returns home, the robot terminal may output a welcome audio message and keep moving around the user.

The audio and video recorder and transmitter 158 records voice and images according to the operation control signal by using a camera and a microphone provided to the robot terminal 100 and transmits the recorded voice and image data to the mobile communication terminal 200 through the communication interface 110. Therefore, the surrounding condition of a robot terminal may be recorded and provided to a user.

The behavior rule DB 160 may be a memory such as a database which stores information and rules used as the basis when the behavior determinator 130 determines a robot behavior. The information and rules stored in the behavior rule DB 160 may be changed and set up by a user or a service operator. Regarding the information stored in the behavior rule DB 160, result information according to input values, such as location information and surrounding condition information may be stored, and the result information may include various kinds of information. Here, any one of such various kinds of information or their combinations may be selected according to rule information.

Figure 3:
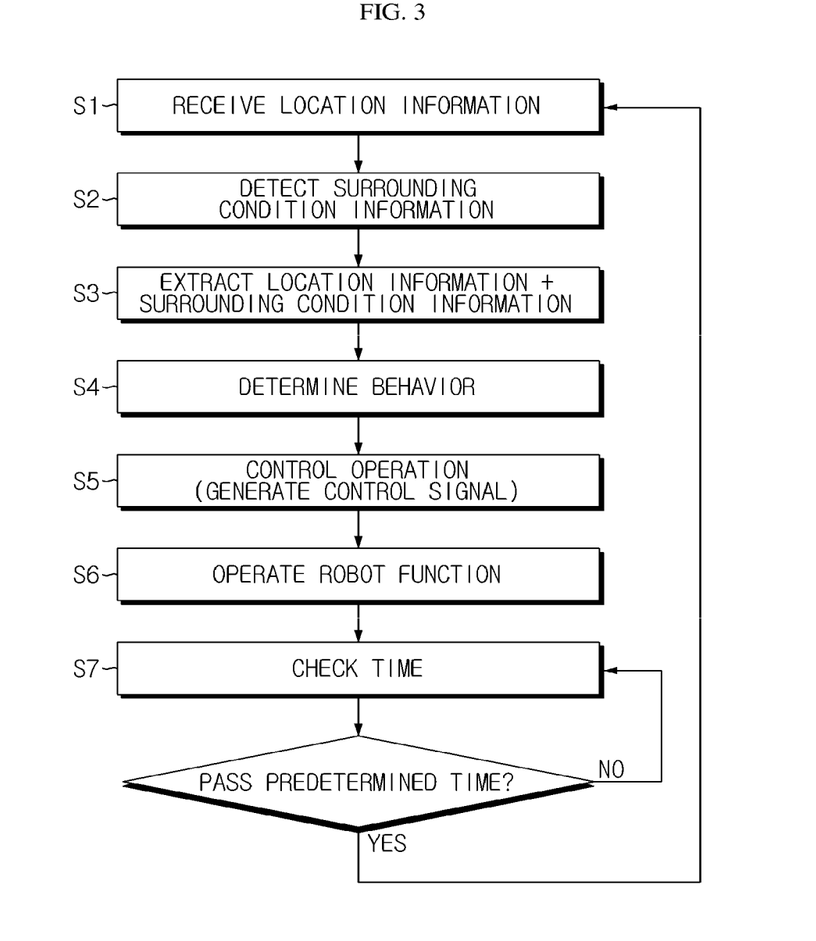
FIG. 3 is a flow diagram illustrating a method for providing a robot interaction service utilizing location information of a mobile communication terminal according to an exemplary embodiment.

FIG. 3 is a flow diagram for illustrating a method for providing a robot interaction service utilizing location information of a mobile communication terminal according to an exemplary embodiment.

Referring to FIG. 3, first, the robot terminal located in a house or a predetermined place is connected to the mobile communication terminal possessed by the owner of the robot terminal via the communication network, and receives current location information of the mobile communication terminal. (in operation S1)

Next, the robot terminal having the location information detects surrounding conditions of the robot terminal with various sensors included in the robot terminal. For example, a motion sensor may be used to check the existence of a person, a temperature sensor may be used to check the temperature in a house, and a home network operation sensor or a light sensor may be used to check whether a room light turns on. (in operation S2)

Then, the robot terminal extracts location information of the mobile communication terminal from the received location information and surrounding condition information from the detected surrounding condition information. At this time, the extracted location information may include current location information of the mobile communication terminal, distance information from the mobile communication terminal to the robot terminal, mobility information of the mobile communication terminal, or the like. (in operation S3).

The robot terminal determines a behavior which will interact with a user based on the location information and the surrounding condition information extracted, as described above. At this time, both of the information is input by using an interaction engine, and a behavior information result value is outputted with reference to the behavior rule DB. The behavior information result value may include sending a welcome message to the mobile communication terminal, turning on a room light and TV, shaking a robot arm for welcoming, or the like. (in operation S4)

As the result of the behavior determination, when the behavior information result value is obtained, the operation of an actual robot is controlled based on the corresponding behavior information result. At this time, a control signal capable of controlling the operation of a robot is generated based on the behavior information result. (in operation S5)

After the operation of a robot is controlled, functions of an actual robot are executed in the robot terminal according to the corresponding control signal. For example, a process of generating a message using a communication interface and transmitting the generated message to the mobile communication terminal, a process of turning on or off the lamp of the robot terminal, a process of turning on the power of home network devices, or the like, are executed. (in operation S6)

After the functions of a robot are executed according to the operation control signal, the robot terminal checks whether a predetermined time has expired. The time may be set up by a user or a service operator. When the robot terminal checks the time, if the predetermined time has expired, the process returns to operation S1. However, if the predetermined time has not yet expired, a stand-by process is performed until the predetermined time expires. Therefore, the robot terminal may perform an interaction behavior and an emotional information service at periodical time intervals. (in operation S7)

Figure 4:
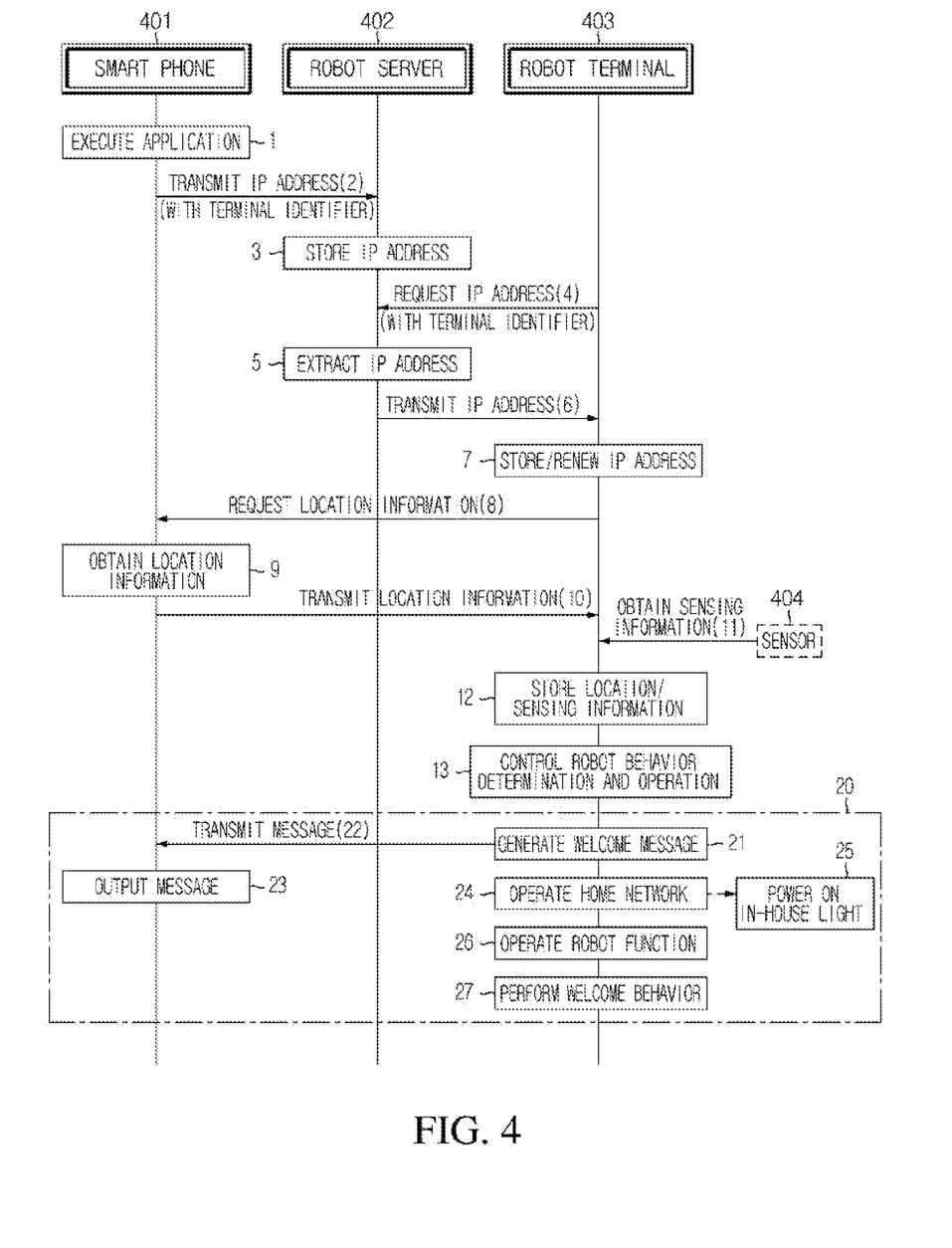
FIG. 4 is a flow chart illustrating a method for providing a robot interaction service utilizing location information of a mobile communication terminal according to an exemplary embodiment, based on each node.

FIG. 4 is a flow chart for illustrating a method for providing a robot interaction service utilizing location information of a mobile communication terminal according to an exemplary embodiment, based on each node.

The procedures of a method for providing a robot interaction service according to an exemplary embodiment will be described based on each node (i.e., a smart phone, a robot server, and a robot terminal) with reference to FIG. 4.

First, as shown in FIG. 4, assuming that the mobile communication terminal according to an exemplary embodiment is a user's smart phone 401, the user executes a robot interaction service application of the smart phone 401. (in operation 1).

If the application is executed, the smart phone 401 transmits a current IP address using the communication network to a robot server 402. At this time, the smart phone 401 transmits a unique identifier together with the IP address to the robot server 402. Also, when the accessed IP address changes, the smart phone 401 transmits the changed IP address to the robot server 402. (in operation 2).

The robot server 402 receives the IP address from the smart phone 401 and stores the IP address together with identification information of the smart phone 401. Of course, when a new IP address is transmitted, the robot server 402 renews the IP address corresponding to the smart phone identifier and stores the new IP address. Therefore, the robot server 402 may store and manage the newest accessed IP address of the smart phone 401. (in operation 3).

In order to perform an interaction service, the robot terminal 403 requests an IP address of a predetermined smart phone such as the smart phone 401 from the robot server. At this time, an IP address request signal is transmitted with identification information of the predetermined smart phone 401. (in operation 4).

If the IP request signal is received from the robot terminal 403, the robot server 402 extracts IP address information corresponding to the smart phone identification information included in the request signal. (in operation 5).

The robot server 402 transmits the IP address extracted as described above to the robot terminal 403 which has requested the IP address. The robot server 402 manages the IP address of the smart phone 401 by updating the same to be the newest information, and when the robot terminal 403 requests an IP address, the robot server 402 provides the IP address of the corresponding smart phone 401. Therefore, the robot server 402 relays information between the two terminals. (in operation 6).

The robot terminal 403 stores the IP address of a smart phone 401 received from the robot server 402 and performs a preparation process for communicating with the smart phone 401. Also, when the robot terminal 403 already has the IP address of the smart phone 401, the robot terminal 403 may renew the IP address and store the newest IP address information received from the robot server 402. (in operation 7).

Then, the robot terminal 403 communicates with the predetermined smart phone 401 by using the IP address of the smart phone 401 and requests current location information of the smart phone 401. At this time, the robot terminal 403 uses applications included in the smart phone 401 for communicating information and requesting the location information. (in operation 8).

The smart phone 401, whose location information is requested, obtains current location information using the location determinator. At this time, according to an exemplary embodiment, various location measuring methods using GPS satellite information, station cell information or wireless cell information are used. (in operation 9).

The smart phone 401, whose current location information is obtained, transmits the obtained location information to the robot terminal 403 which has requested the location information of the smart phone 401. (in operation 10).

The robot terminal 403 receives the current location information of the smart phone 401 and detects surrounding conditions with various sensors 404 included therein to obtain sensing information. At this time, various kinds of surrounding condition information of the robot terminal is obtained by using various sensors included in the robot terminal 403. (in operation 11).

The robot terminal 403 stores the location information received from the smart phone 401 and the surrounding condition information obtained by using the sensors 403. (in operation 12).

Next, the robot terminal 403 determines an interaction behavior of a robot based on the location information and the surrounding condition information stored as described above and controls the operation of a robot according to the determination result. Here, the robot behavior is determined with reference to the behavior rule DB included in a robot. (in operation 13)

Thus, when the robot terminal 403 determines the interaction behavior and controls the operation of a robot according to the determination result, the robot terminal 403 performs various behaviors and operation processes based on the determination result of the robot behavior according to the operation control signal. (in operation 20).

Hereinafter, examples of various behaviors and operation processes made by the robot terminal 403 will be described in detail according to various exemplary embodiments. First, in order to explain the examples of behaviors and operations of a robot, it is assumed that a smart phone user returns home after work and the location information of the user represents that the user is near the user's house where the robot terminal 403 is located.

According to the assumption, the robot terminal 403 figures out that the user is located near the user's house and determines a welcome behavior and operation processes followed by the welcome behavior as the behavior information of the robot, and a signal for controlling the operation of the robot according to the determination result is generated.

Therefore, first, the robot terminal 403 generates a welcome message for the user who has returned home. At this time, one of various messages stored in the behavior rule DB is selected and generated as the welcome message, which relieves the boredom caused by repeating the same message every time the user returns. (in operation 21).

After generating the message, the robot terminal 403 transmits the generated welcome message to the smart phone 401. The smart phone 401 receives the message and outputs the welcome message on the screen of the smart phone 401. Therefore, when a user returns home, the user receives a welcome message from a robot, and thus, an emotional service is provided to the user (in operations 22, 23).

Also, the robot terminal 403 not only sends a welcome message to a user, but also links to a home network to control operations of all kinds of devices connected to the home network. That is, since the user has come back home in this assumption, the robot terminal turns on an indoor lamp connected to the home network to light up the house. (in operations 24, 25).

Moreover, the robot terminal 403 controls to execute functions of a robot for welcoming the user's return. The robot terminal 403 performs welcome behaviors by shaking robot arms, moving robot back and forth, or the like, according to the operation control signal. (in operations 26, 27).

For example, the robot terminal 403 may determine that the user is about to come home and turn on the TV or turn up or down the thermostat depending on the day and time information. The robot terminal 403 may further dance around and so on.

The behaviors of the robot terminal 403 as described above are just examples based on the above assumption, and various other behaviors may also be performed.

Accordingly, the method for providing a robot interaction service according to exemplary embodiments provides various interaction behaviors and an emotional service based on a current location of a user and surrounding conditions of a robot terminal, thereby providing the user with greater fun and interest.

The exemplary embodiments have been described in detail. However, it should be understood that the detailed description and specific examples, while indicating exemplary embodiments, are given by way of illustration only, since various changes and modifications within the spirit and scope of the disclosure will become apparent to those skilled in the art from this detailed description.

It will be understood by those skilled in the art that various changes and modifications may be made without changing a technical conception and/or any essential features of the exemplary embodiments. Thus, above-described exemplary embodiments are exemplary in all aspects, and do not limit the present disclosure. The scope of the present disclosure is defined by the following claims and their equivalents rather than by the detailed description of exemplary embodiments. It shall be understood that all modifications and embodiments conceived from the meaning and scope of the claims and their equivalents are included in the scope of the present disclosure.

What is claimed is:

1. A system for providing a robot interaction service utilizing location information of a mobile communication terminal, comprising:
   a robot server, provided in a communication network, configured to receive a current location information of the mobile communication terminal and to transmit the location information to a robot terminal using the communication network; and
   the robot terminal configured to receive the location information from the mobile communication terminal in order to determine a robot behavior based on the received location information, and to control the operation of the robot terminal based on the determined robot behavior.

2. The system of claim 1, wherein the robot terminal is configured to obtain surrounding condition information by detecting a surrounding condition and to determine the robot behavior by combining the received location information and the obtained surrounding condition information.

3. The system of claim 1, wherein the robot server is configured to receive an internet protocol (IP) address from the mobile communication terminal and to store the IP address in a memory of the robot server, and
   wherein the robot server is configured to relay information by transmitting the stored IP address in response to the robot terminal requesting the IP address of the mobile communication terminal.

4. The system of claim 1, wherein the behavior of the robot terminal is determined based on:
   location information of the mobile communication terminal, and distance information indicating a distance between the mobile communication terminal and the robot terminal, extracted from the received location information; and
   information, extracted from the obtained surrounding condition information, selected from at least one of: current time, current date, current weather, conditions for operating devices connected to a home network, peripheral person and object conditions.

5. The system of claim 1, wherein the location information is measured by a global positioning system (GPS) or a cell-based location measurement device.

6. The system of claim 1, wherein the robot terminal is configured to determine distance of the mobile communication terminal from the robot terminal based on the received location information and based on stored location information of the robot terminal and
   wherein, based on the determined distance, the robot is configured to actuate at least one device of a home network.

7. The system of claim 1, wherein the robot terminal is further configured to:
   randomly select at least one message from a stored plurality of messages that correspond to the determined robot behavior; and
   transmit the selected message to the mobile communication terminal.

8. The system of claim 1, wherein the robot behavior comprises a simulation of an expression of an emotion.

9. The system of claim 1, wherein the robot terminal is further configured to perform a movement to simulate expressing an emotion.

10. A method of providing a robot interaction service utilizing location information of a mobile communication terminal, comprising:
    receiving, by a robot terminal, a current location information of the mobile communication terminal via a communication network;
    obtaining, by a robot terminal, surrounding condition information by detecting, with a sensor, a surrounding condition;
    determining, by the robot terminal, a robot behavior based on the received location information and the obtained surrounding condition information; and
    controlling, by the robot terminal, the operation of the robot terminal based on the determined robot behavior.

11. The method of claim 10, further comprising:
    performing at least one of: transmitting a message to the mobile communication terminal, controlling an in-house home network, executing a robot function, recording an instance of audio or video content, or transmitting an instance of audio or video content based on the determined robot behavior.

12. The method of claim 10, wherein the receiving the current location information comprises:
    receiving, by a robot server, the current location information of the mobile communication terminal; and
    transmitting, by a robot server, the location information to the robot terminal in a house using a communication network.

13. The method of claim 12, further comprising:
requesting, by the robot terminal to the mobile communication terminal, the location information which is measured by a global positioning system (GPS) in the mobile communication terminal or a cell-based location measurement device.

14. The method of claim 10, wherein the determining the robot behavior comprises:
determining a distance information indicating a distance between the mobile communication terminal and the robot terminal based on the received location information; and
determining the robot behavior based on the distance and the obtained surrounding condition information.

15. The method of claim 10, wherein the surrounding condition is at least one of: current time, current date, current weather, conditions for operating devices, peripheral person and object conditions.

16. The method of claim 10, wherein the robot behavior comprises simulating an expression of an emotion.

17. The method of claim 10, wherein the determining the robot behavior comprises:
determining a distance information indicating a distance between the mobile communication terminal and the robot terminal based on the received location information and location information of the robot terminal; and
actuating at least one device of a home network which is connected with the robot terminal based on the determined distance.

18. The method of claim 17, wherein the operation comprises:
randomly selecting at least one message from a stored plurality of messages that correspond to the determined robot behavior and transmitting the selected message to the mobile communication terminal.

* * * * *